UNITED STATES PATENT OFFICE.

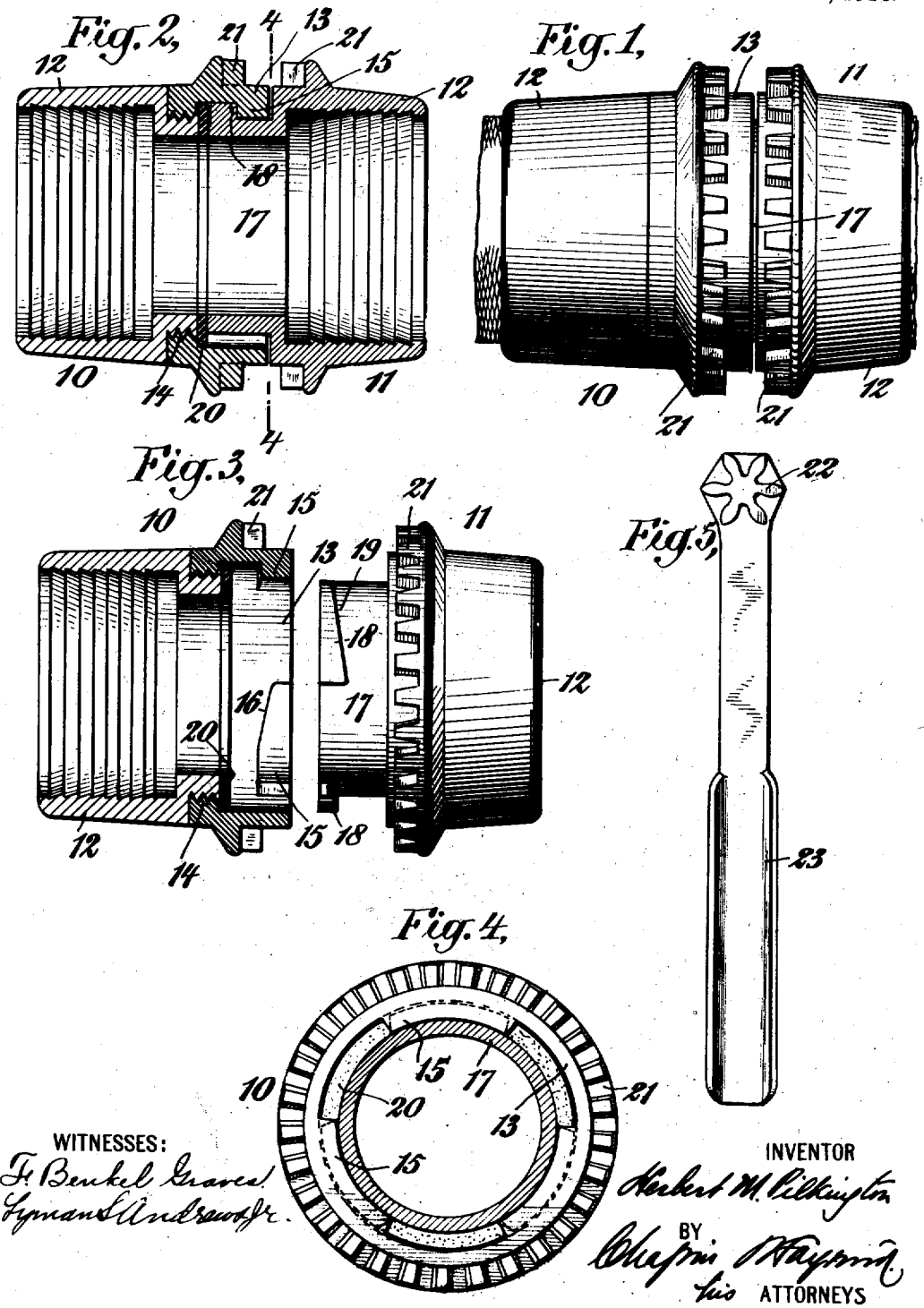

HERBERT M. PILKINGTON, OF RIDGEWOOD, NEW JERSEY.

HOSE-COUPLING.

977,472.  Specification of Letters Patent.  Patented Dec. 6, 1910.

Application filed July 10, 1909. Serial No. 506,915.

*To all whom it may concern:*

Be it known that I, HERBERT M. PILKINGTON, a citizen of the United States of America, and a resident of Ridgewood, county of Bergen, and State of New Jersey, have invented certain new and useful Improvements in Hose-Couplings, of which the following is a specification, reference being had to the accompanying drawings, forming a part thereof.

My invention relates to improvements in hose couplings and particularly to couplings for high pressure hose such as fire hose and the like.

The main object of my invention is to increase the facility with which the hose coupling may be connected and disconnected, to reduce the power necessary to be applied for the secure locking of the parts together, and to simplify the construction and reduce the cost of manufacture of such a device.

To these ends my invention consists in certain novel details of construction and combinations of parts as will presently be described, and in order that my invention may be fully understood, I will now proceed to describe in detail a coupling constituting an embodiment of my invention, having reference to the accompanying drawings illustrating the same, and will then point out the novel features in claims.

In the drawings: Figure 1 is a view in side elevation of a complete coupling connected to a hose, the members thereof being securely locked together. Fig. 2 is a view in central longitudinal section through the coupling, showing the parts securely interlocked but removed from the hose. Fig. 3 is a view of the two coupling members disconnected from each other, one being shown in central longitudinal section and the other in side elevation. Fig. 4 is a view in transverse vertical section through the coupling, the plane of section being upon the line 4—4 of Fig. 2. Fig. 5 is a detail view in side elevation of a wrench to be employed in connection therewith.

The hose coupling comprises two members 10 and 11, each member being provided with a hub 12 for the reception of a hose end. The interior portion of these hubs is preferably serrated as is usual, or it may be formed in any desired manner for the reception of a hose, the hose being secured in place by any of the well known methods usually employed for this purpose. The member 10 is preferably composed of two parts, the hub portion 12 and a relatively rotatable portion 13. These two portions are permitted free relative rotation but are prevented from any but slight relative longitudinal movement by a series of interlocking teeth 14. These teeth resemble screw threads in cross section, but differ therefrom in that they have no pitch, that is to say, they are in the form of a plurality of alternately arranged endless concentric projections and depressions. The portion 13 has three inwardly projecting abutments 15, the rear faces 16 of which are inclined. The length of each of these projections is preferably slightly less than one-sixth of the inner circumference of the portion 13, as is shown in Fig. 4, and the three abutments are disposed equidistantly around the portion 13 so that the said abutments alternate with open spaces of substantially equal length. The member 11 is preferably made as a single integral portion; it includes in addition to the hub 12 a central part 17 which is of a diameter not greater than the diameter of a circle which bounds the inner faces of the abutments 15 of the part 13. It is thus of such size as to be freely received within a part 13 as will be well understood by reference to the drawings. This cylindrical portion 17 is provided with outwardly projecting abutments 18 complementary to the abutments 16. There are three of these abutments 18, the length thereof being such as to permit their being received within the open spaces between the ends of the abutments 15. The rear faces of the abutments 18 are inclined at an angle as is shown at 19 whereby they correspond to the angular faces 16 of the abutments 15. When it is desired to connect the coupling members together, the two members are presented between each other with the abutments 15 and 18 arranged opposite the corresponding spaces between the opposite coupling members; the coupling members are then pressed together and finally the coupling member 11 and the portion 13 of the coupling member 10 are rotated in opposite directions with respect to each other. The latter movement causes the rear inclined faces 16 and 19 of the abutments 15 and 18 to co-engage and to force the said coupling members into intimate engagement with each other. A gasket 20 is disposed between the end of the portion 12 of the coupling member 10, and the portion 17 of the coupling member 11 so that as the coupling members are drawn together, pressure will be applied upon the gasket to make a tight joint between the members. The two sets of abutments act in the nature of a triple pitch screw to force the members together, and the said abutments being quite heavy and strong, they will resist a very great pressure and their co-engagement will hold the parts firmly in place.

The relative rotational movement between the coupling members to effect the locking above set forth is accomplished in the following manner: Each coupling member is provided with a set of teeth 21, the teeth of the coupling 21 being disposed upon the portion 13 thereof, while the teeth of the coupling 11 are made as a portion of the coupling member 11 as a whole, being preferably located between the hub 12 and the cylindrical extension 17. The sets of teeth are oppositely disposed so that when the two members are presented for co-engagement, the teeth form two parallel circular racks which face each other, as will be clearly understood from reference to Fig. 1 of the drawings. I employ a wrench which is provided with a part adapted to simultaneously engage the two sets of teeth, and a handle by which it may be turned. Such a wrench is shown in Fig. 5, the said wrench having a portion 22 which constitutes in effect a gear pinion, and a handle or lever 23. The pinion 22 may be inserted between the rack teeth and caused to engage them at any part around the hose coupling, and then by giving the same a partial turn, a powerful leverage is applied to relatively rotate the parts. It will be understood that in the application of the wrench, all of the power is applied directly to turn the parts because of the simultaneous co-engagement between the two parts. By this means no power is wasted and there is no strain put upon the hose to twist the same.

What I claim is:

1. In a hose coupling, the combination with a member having a cylindrical extension provided with a plurality of angularly faced abutments around the exterior thereof, of another member comprising a hub and a relatively rotatable sleeve arranged to receive the said cylindrical extension of the first said member, and provided with a plurality of interiorly disposed angularly faced abutments complementary to the said abutments of the first said member, the said sleeve and first said member being each provided exteriorly with a continuous circular toothed rack, the teeth of which are contiguously disposed to adapt them for simultaneous co-action with a wrench.

2. In a hose coupling, the combination with a member having a cylindrical extension provided with a plurality of angularly faced abutments around the exterior thereof, of another member comprising a hub and a relatively rotatable sleeve arranged to receive the said cylindrical extension of the first said member, and provided with a plurality of interiorly disposed angularly faced abutments complementary to the said abutments of the first said member, the said sleeve and the first said member being each provided exteriorly with an endless toothed rack, the teeth of which are contiguously disposed, and a wrench provided with a toothed pinion for simultaneous engagement with the teeth of both the said racks.

HERBERT M. PILKINGTON.

Witnesses:
D. Howard Haywood,
Lyman S. Andrews, Jr.